United States Patent [19]

Richards et al.

[11] Patent Number: 5,770,652

[45] Date of Patent: *Jun. 23, 1998

[54] DISPERSIVE REACTIVE EXTRUSION OF POLYMER GELS

[76] Inventors: William David Richards, 22 Heritage Pkwy., Scotia, N.Y. 12302; Greg R. Bradtke, 20 Charlton Rd., Ballston Spa, N.Y. 12020-3509; Robert Howard Wildi, Rte. 1, Box 207D, Parkersburg, W. Va. 26101; Linda McAdam Gemmell, 9 Merrywood La.; Jack Alvon Hill, 1311 27th St., both of Vienna, W. Va. 26105; Vinod Kumar Berry, 104 Brentwood Heights, Parkersburg, W. Va. 26101; Catherine Marie Monique Pottier-Metz, 62 rue Larris, 60650 Mont Saint Adrien, France; John Robert Campbell, 41 Pepper Hollow, Clifton Park, N.Y. 12065; Jack Lew Little, Rte. 2, Box 198, Belpre, Ohio 45714; Kenneth Gordon Powell, 4513 Wood Valley Dr., Raleigh, N.C. 27613

[ * ] Notice: The term of this patent shall not extend beyond the expiration date of Pat. No. 5,530,062.

[21] Appl. No.: 545,059

[22] Filed: Nov. 17, 1995

Related U.S. Application Data

[63] Continuation-in-part of Ser. No. 345,196, Nov. 28, 1994, abandoned.

[51] Int. Cl.$^6$ ............................. C08L 69/00; C08L 25/06; C08L 25/12; C08L 63/00
[52] U.S. Cl. .............................. 525/65; 525/67; 525/108; 525/109
[58] Field of Search ................................... 525/108, 109, 525/125, 146, 148, 194, 65, 67

[56] References Cited

U.S. PATENT DOCUMENTS

| 5,026,777 | 6/1991 | Jalbert | 525/65 |
| 5,037,888 | 8/1991 | Vanderbilt | 525/108 |
| 5,342,887 | 8/1994 | Bergstrom | 525/108 |
| 5,395,889 | 3/1995 | Fujiguchi | 525/148 |
| 5,508,347 | 4/1996 | Ohmae | 525/74 |
| 5,530,062 | 6/1996 | Bradtke | 525/65 |

FOREIGN PATENT DOCUMENTS

| A-519098 | 12/1992 | European Pat. Off. . |
| A-561512 | 9/1993 | European Pat. Off. . |
| A-639609 | 2/1995 | European Pat. Off. . |

*Primary Examiner*—David Buttner

[57] ABSTRACT

There is provided a process for making a gel-containing additive concentrate by mixing a reactive polymer such as SAN and a substantially immiscible carrier polymer such as polycarbonate or polystyrene and reactively extruding the reactive polymer and carrier polymer in the presence of a multi-functional crosslinking agent and catalyst

15 Claims, 5 Drawing Sheets

DISPERSIVE REACTIVE EXTRUSION OF POLYMER GELS

The present Application is a continuation-in-part of the U.S. application Ser. No. 08/345,196 filed Nov. 28, 1994 now abandoned.

Field of the Invention

The present invention relates to a reactive extrusion process for making a gel containing additive concentrate, and more particularly to a process for generating an additive for the reduction of gloss in thermoplastic compositions. The additive is formed by mixing a reactive polymer with a carrier polymer and reactively extruding the reactive polymer in the presence of a multi-functional crosslinking agent and catalyst.

Description of the Related Art

In some instances, it is desirable that the surfaces of unpainted injection molded parts have low gloss so that light reflection is minimized. Attempts have been made to make low gloss compositions comprising a polymer blend of a polycarbonate and an emulsion grafted acrylonitrile-butadiene-styrene (ABS) polymer, and a low gloss enhancing amount of a polyepoxide. For example, U.S. Pat. No. 5,026,777 issued to Jalbert et al. teaches using polyepoxide to reduce the gloss in some specific polycarbonate (PC)/ABS blends. A single step compounding process can result in undesired side reactions, including side reactions of the polyepoxide with additional ingredients such as phosphite stabilizers and some organic and metal pigments which may affect product consistency and quality. Also, in general, single step compounding processes as set out in Jalbert et al. exhibit some problems in obtaining consistent combinations of desired levels of low gloss and high impact strength, as well as other properties.

U.S. Pat. No. 5,342,887 issued to Bergstrom et al. teaches the preparation of elastomeric composition by crosslinking a functionalized olefin polymer. Bergstrom fails to teach the preparation of low gloss compositions and the use of the monomeric epoxide together with acid catalyst as a route to crosslink SAN nor the appropriate process conditions to simultaneously produce and disperse the resultant gel.

U.S. Pat. No. 5,037,888 issued to Vanderbilt describes the crosslinking of elastomeric compositions based on epoxy curing chemistry. Vanderbilt fails to teach the combination of epoxide, acid and SAN to produce low gloss compositions.

U.S. Pat. No. 5,395,889 issued to Fujiguchi et al. teaches obtaining low gloss compositions from crosslinking a rubber. Fujiguchi et al. fails to teach the preparation of high gel content additive concentrate and combination of epoxide acid plus SAN.

Attempts to overcome some of these problems include (1) U.S. Pat. No. 5,336,701 issued to Wildi et al. entitled "Process Improvement for Improved Color Reduced Gloss Thermoplastic Compositions" which involves compounding an acrylonitrile polymer with an electrophilic reagent to form polymeric gels and admixing an effective amount of water with the polymeric gels sufficient to reduce the yellowness index of the gels, and blending an effective gloss reducing amount of the reduced color gels with a thermoplastic resin; and (2) Wildi et al., U.S. Pat. application Ser. No. 07/841,141, filed Feb. 25, 1992, titled "Reduced Gloss Thermoplastic Compositions and Processes for Making Thereof" now abandoned, which involves compounding an acrylonitrile polymer with an electrophilic reagent to form polymeric gels, and blending an effective gloss reducing amount of the gels with a thermoplastic resin. These prior U.S. applications set out solutions to some of the problems encountered in the single step process set out in Jalbert et al., but a problem still exists in the inconsistency of producing a product having adequate physical properties such as surface gloss and impact strength.

Another attempt to overcome the deficiencies of Jalbert et al. includes U.S. Ser. No. 08/110,142 filed Aug. 20, 1993 titled "Process for the Manufacture of Low Gloss Resins" now U.S. Pat. No. 5,536,780. This application relates to a process for making a reduced gloss thermoplastic compositions by compounding a nitrile polymer with an electrophilic reagent to form a gel followed by blending the polymeric gel with a thermoplastic resin to make a concentrate and then admixing the concentrate with a second thermoplastic resin to produce the final composition. However, this process also suffers from the disadvantage of requiring multiple process steps and multiple handling operations.

SUMMARY OF THE INVENTION

Figure 1A:
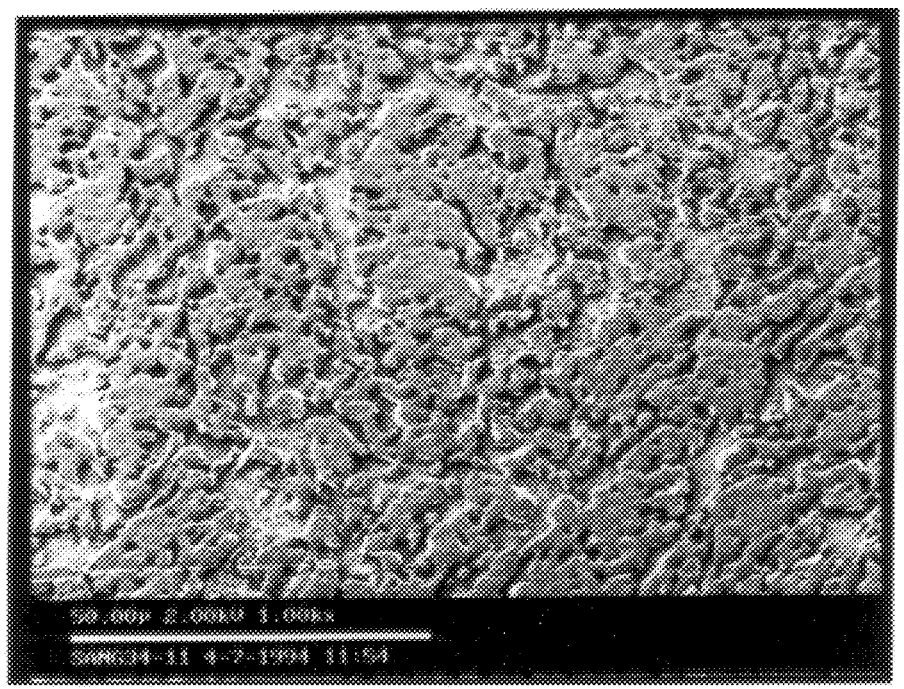
FIG. 1 illustrates four (4) photographs which were taken with a scanning electron microscope (SEM) of pellets made by the process of the present invention (see Blend 2 in Example 2). The sample was etched to remove a light layer of polycarbonate, leaving a SAN/gel phase as a raised surface. The SEM photographs clearly depict two distinct phases with a co-continuous morphology, i.e., the gel and polycarbonate are separate phases.
Figure 1B:
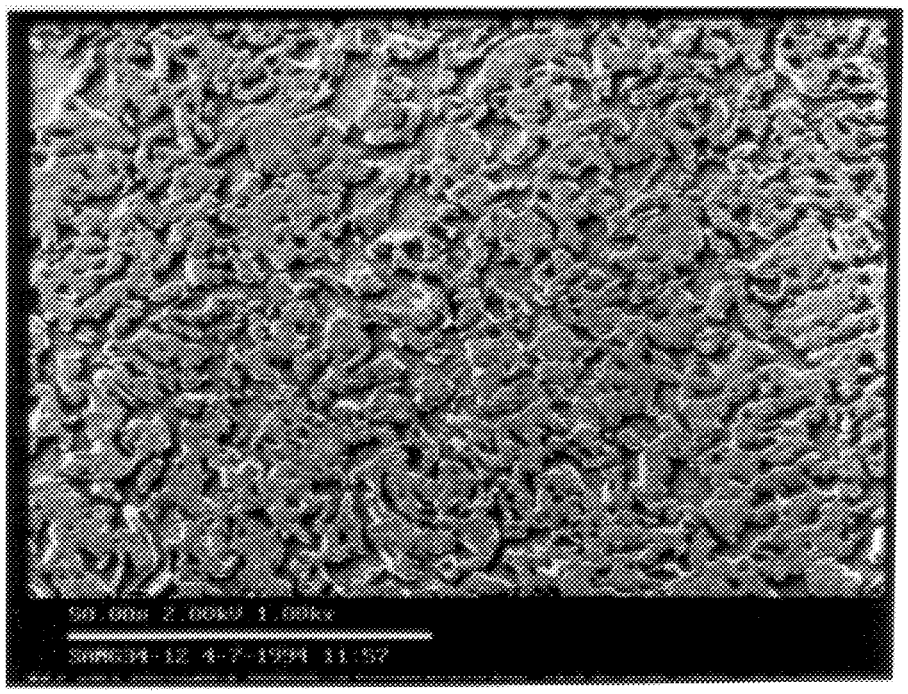
Figure 1C:
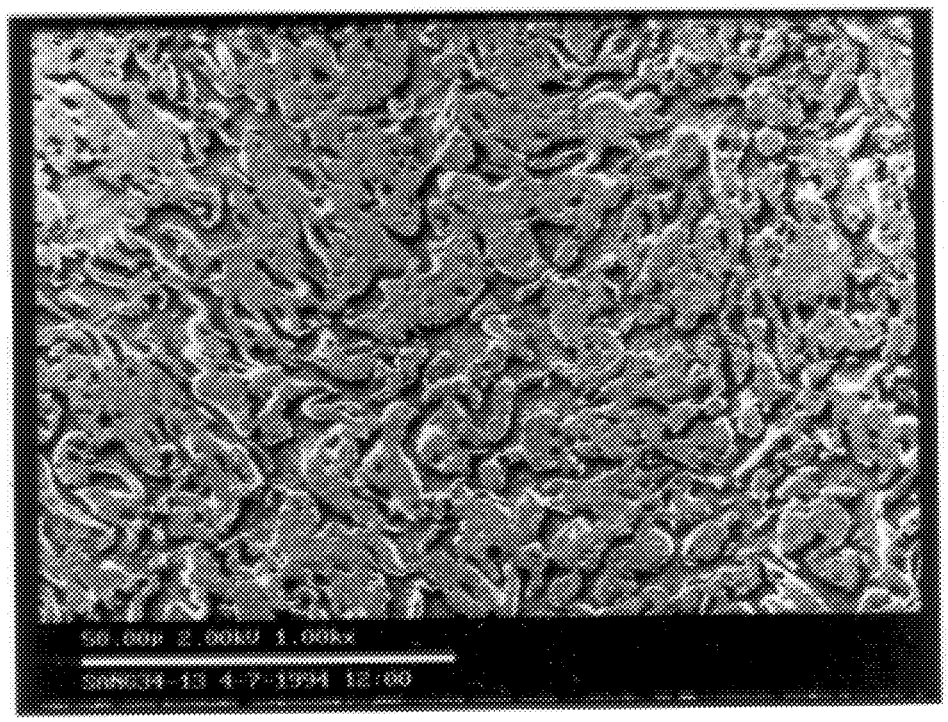
Figure 1D:
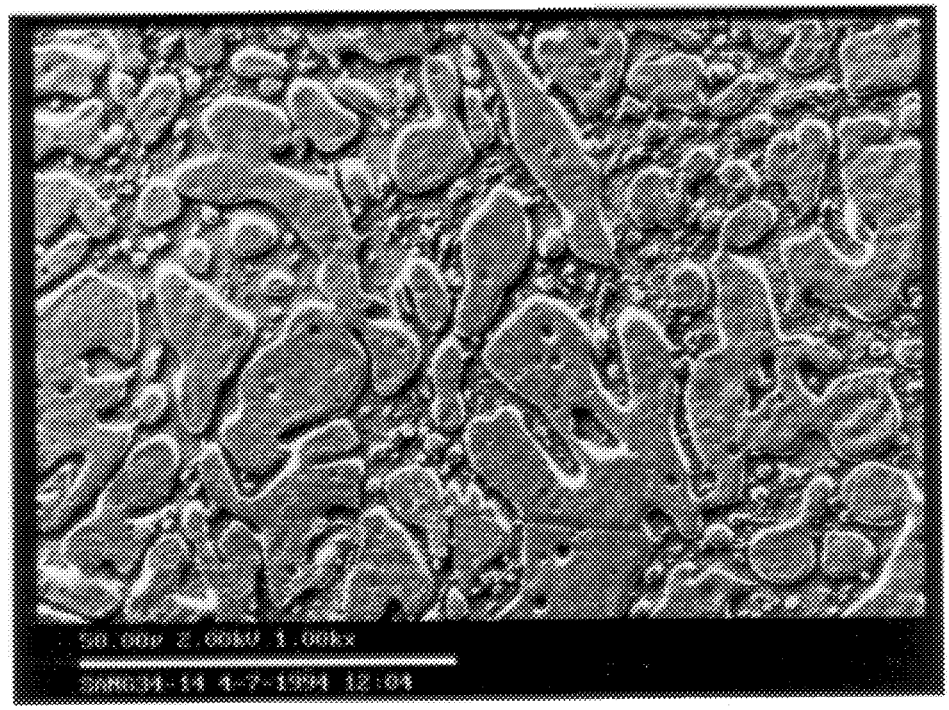
Figure 2A:
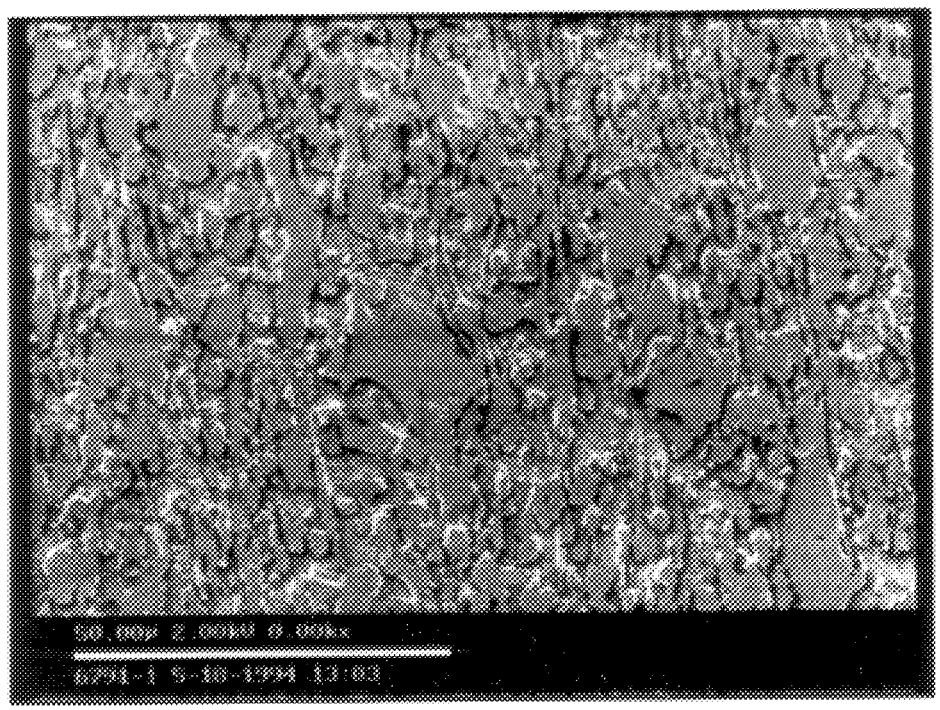
FIG. 2 illustrates four (4) photographs from an SEM which represent a composition made by the master batch approach described in U.S. Ser. No. 08/110,142(U.S. Pat. No. 5,536,780). The micrographs of FIG. 2 were taken from a sample run under the same or similar conditions as Blend 1 in Example 2. From this SEM it is clear that the gel is much more poorly dispersed than in FIG. 1 and the overall morphology is not as tightly controlled as that in FIG. 1.
Figure 2B:
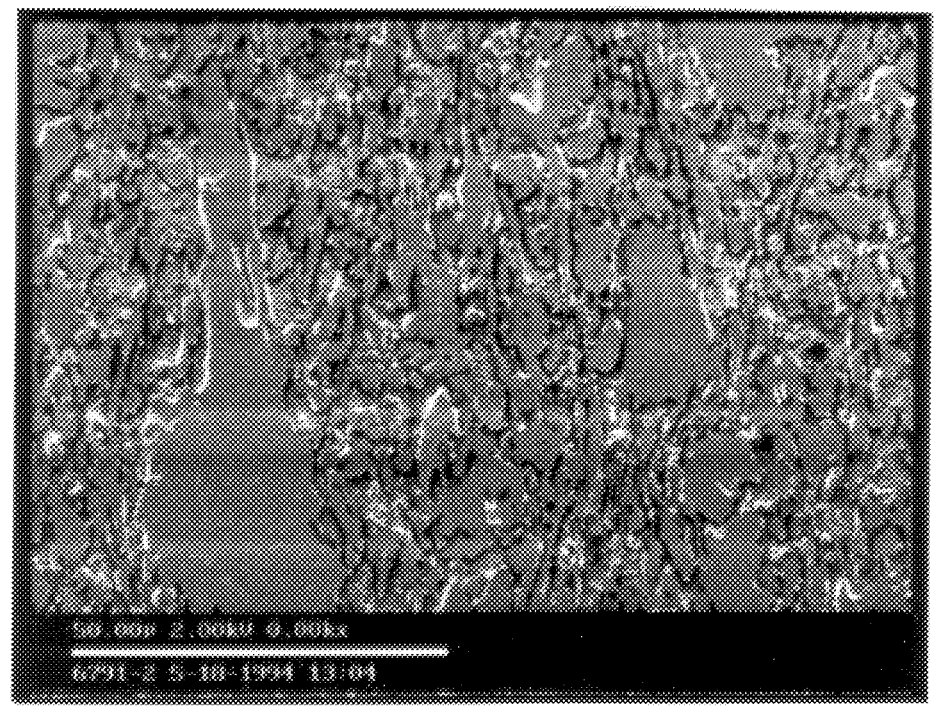
Figure 2C:
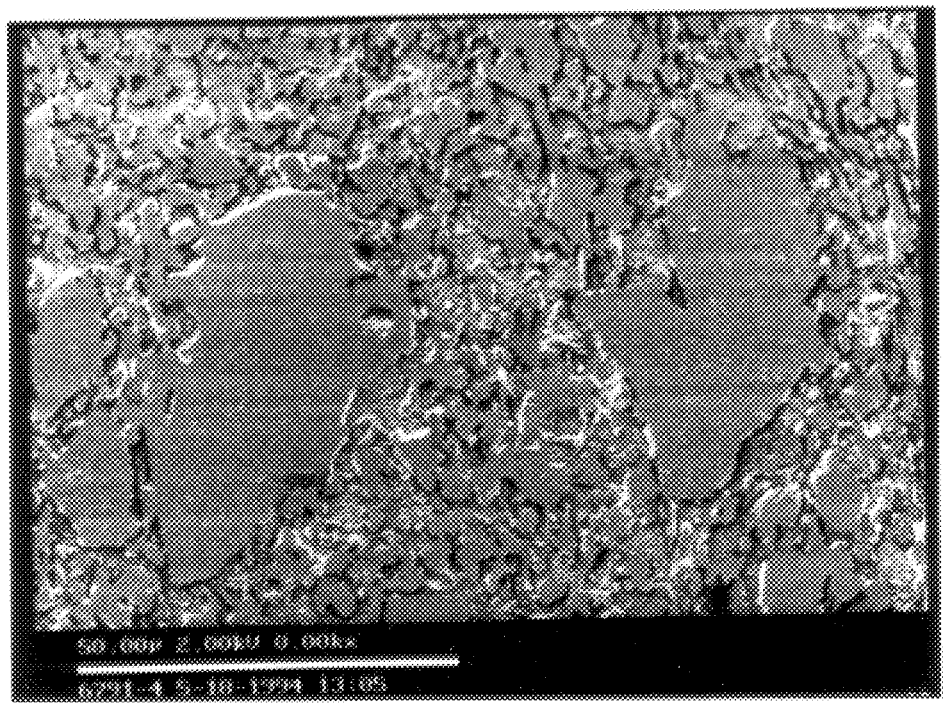
Figure 2D:
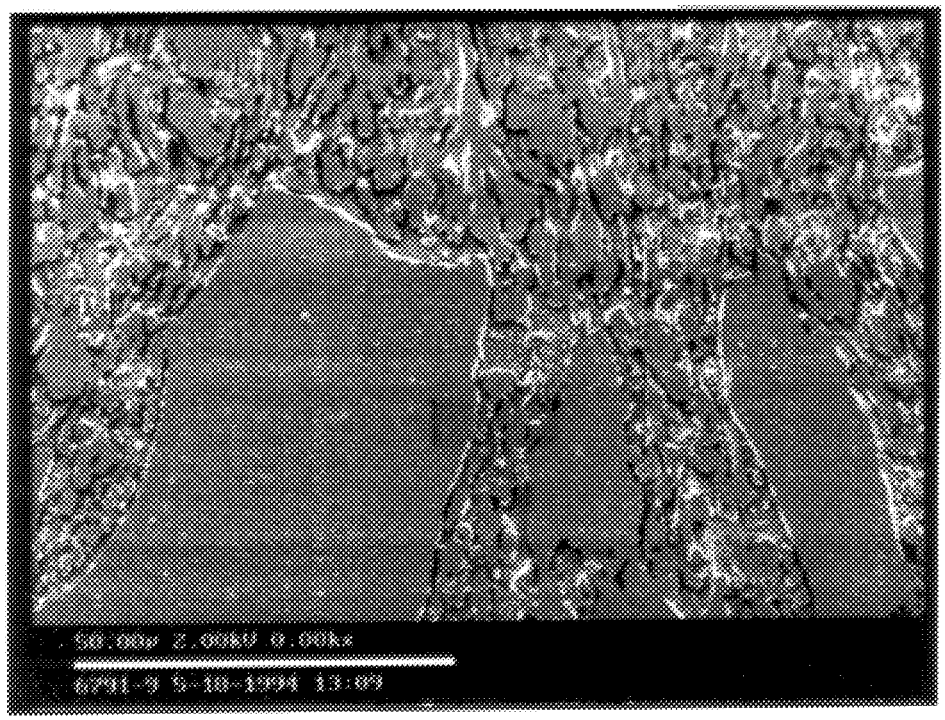

The present invention is directed to a process for making a gel-containing additive concentrate by reactive extrusion. The process comprises mixing a reactive polymer and a substantially immiscible carrier polymer and reactively extruding the reactive polymer and carrier polymer in the presence of a multi-functional crosslinking agent and a catalyst such that the reactive polymer crosslinks to form a gel. The present process provides for unexpectedly high control of the morphology, and unexpectedly high efficiency and consistency in achieving low gloss in blends containing the additive concentrate. Additionally, the present process surprisingly allows for the preparation of a gel at improved rates in the presence of a substantially immiscible carrier which acts as a diluent in a reactive extrusion process.

DETAILED DESCRIPTION OF THE INVENTION

A process is provided for reactively extruding a gel containing additive concentrate, wherein the process involves a first step of mixing a reactive polymer in a substantially immiscible carrier polymer. The term "additive concentrate" is defined as a gel containing composition comprised of a carrier polymer and a partially or completely crosslinked reactive polymer. The additive concentrate is typically used at relatively low concentrations as a gloss reducing agent in thermoplastic blend. By the term "reactive polymer" it is understood that the polymer is sufficiently reactive that it will crosslink in the presence of appropriate chemical reagents e.g., a catalyst and/or a multi-functional crosslinking agent, so as to form a gel. Typically the reactive species may be a substituent within the polymer capable of undergoing reaction in the presence of the aforementioned reagents. Those skilled in the art will be familiar with suitable reactive substituents, examples of which include nitrile groups, carboxylic acid groups, anhydrides, epoxy groups, esters, amines and ethers. Preferred reactive polymers according to the present invention include nitrile-containing polymers such as acrylonitrile. It will also be understood by those skilled in the art that the reactive polymer includes not only those polymers which normally contain the reactive species but also those polymers which have been modified or functionalized to contain the reactive species. In a preferred embodiment of the present invention, the reactive polymer may also be selected from the following reactive polymers: polyesters, diene rubbers, silicone rubbers, anhydride copolymers, nylons, urethanes, glycidyl-methacrylate containing polymers, and mixtures thereof.

The "carrier polymer" according to the present invention is a substantially non-reactive polymer or mixture of polymers, i.e., one which is substantially immiscible with the reactive polymer, which acts in a sense as a diluent for the reactive polymer. As such, it is important that the carrier polymer not react to any appreciable extent with the reactive polymer or the multi-functional crosslinking agent used to crosslink the reactive polymer. Accordingly, the carrier polymer will vary depending upon the combination of the reactive polymer and multi-functional crosslinking agents used in the composition. However, suitable examples of carrier polymers include, e.g., polycarbonate, polystyrene, polyester, polyolefin, polyimides, and polyphenylene ether, polymethyl methylacrylate or mixtures thereof. In one preferred embodiment according to the present invention, the carrier polymer comprises a polycarbonate polymer, and more preferably a bisphenol-A polycarbonate. In another preferred embodiment according to the present invention, the carrier polymer comprises polystyrene.

The second step according to the present process involves the reactive extrusion of the reactive polymer and carrier polymer in the presence of a multi-functional crosslinking agent. The multi-functional crosslinking agent should be selected such that it causes the reactive polymer to crosslink sufficiently to form a gel. The term "multi-functional crosslinking agent" according to the present invention therefore encompasses any material that has two or more functional groups that is sufficiently reactive with a particular reactive polymer so as to initiate crosslinking of the reactive polymer and the formation of a gel polymer. Suitable multi-functional crosslinking agents include, e.g., polyepoxides, amines, bisoxazolines as well as di-and tri-carboxylic acids.

In a preferred embodiment of the present invention, the multi-functional crosslinking agent comprises a polyepoxide and more preferably a diepoxide. In another preferred embodiment of the invention, the multi-functional crosslinking agent further comprises a catalyst such as organic acids, mineral acids, lewis acids, and mixtures thereof. The purpose of such a catalyst is to accelerate or increase the amount of crosslinking taking place in the reactive extrusion. Several of the preferred catalysts include zinc chloride, sulfuric acid, sulfonic acids in general with methyl sulfonic acid, p-toulene sulfonic acid and dodecylbenzene sulfonic acid as specifically preferred species. When the multi-functional crosslinking agent comprises a polyepoxide, it is preferred that the catalyst be zinc chloride or a sulfonic acid such as dodecylbenzene sulfonic acid.

Although the amount of carrier polymer and reactive polymer in the composition is not critical, it is preferred that the carrier polymer be present at a level ranging from about 20 to about 99 percent based on the weight of reactive polymer and carrier polymer combined. Likewise, it is preferred that the amount of reactive polymer in the extruder range from about 1 to about 80 percent based on the combined weight of carrier polymer and reactive polymer. It is more preferred that the amount of carrier polymer range from about 30 to about 70 percent and the reactive polymer range from about 70 to about 30 percent based on the combined weight of reactive polymer and carrier polymer.

Reactive extrusion, also termed reactive processing or reactive compounding, refers to the performance of chemical reactions during extrusion processing of polymers. In this case an extrusion device is used as a chemical reactor instead of only as a processing aid. The chemical reaction may take place in the polymer melt phase or, less commonly, in the liquid phase, as when bulk polymerization of monomers is performed in an extruder, or in the solid phase when the polymer is conveyed through the extruder in a solvent slurry.

Reactive extrusion usually takes place in conventional single-screw or twin-screw extruders. An advantage of reactive extrusion is the absence of solvent as the reaction medium. Because no solvent stripping or recovery is required, product contamination by solvent or solvent impurities is avoided.

Because of their versatility, most extruder reactors are twin-screw extruders, which possess a segmented barrel, each segment of which can be individually cooled or heated externally. In addition to external heating, a molten material may be shear heated by the resistance of viscous material to the conveying motion of the screw; these processes provide energy for chemical reaction. Extruder screws often have specialized sections or configurations, e.g., high shear mixing sections. Twin-screw extruder screws may be equipped with interchangeable screw elements that provide different degrees of mixing and surface area exposure by varying the depth between screw flights, the individual flight thicknesses, and direction and degree of flight pitch. Kneading blocks may be included as screw elements to provide intensive mixing. By varying the external heating, the screw element configuration, and the clearance between screw and barrel wall in individual barrel segments, the total energy and the degree of mixing of material in each barrel segment may be varied. In this way an extruder may be transformed into a chemical reactor with controlled reaction zones made up of individual barrel segments. In each of these segments sequential chemical processes can take place.

In a typical reactive extrusion process, the reactants are fed into the extruder feed throat where the material is usually heated to initiate reaction or increase the reaction rate. The reactant mixture is conveyed through sequential barrel segments. where degree of mixing and specific energy input bring the reaction to the desired degree of completion within the limits of residence time in the extruder. At this stage the reaction may be quenched by cooling or addition of a catalyst quencher where applicable, and volatile by-products or excess reactants may be removed. Molten polymer is forced from the extruder through a die with one or more openings. The geometry of the die openings is one factor determining the pressure against which the extruder has to pump by the conveying motion of the internal screw. Polymer melt issuing from the die is usually rapidly cooled by contact with a fluid medium such as water. Cooling and solidification quench any chemical reaction still occurring that may not have been specially quenched in the extruder.

An advantage of an extrusion device as a reactor is the combination of several chemical process operations into one piece of equipment with accompanying high space-time yields of product. An extruder reactor is ideally suited for continuous production of material after equilibrium is established in the extruder barrel for the desired chemical processes.

For extruder reactors typical operating conditions are 70°–500° C. Although this entire range of temperature may extend over the length of an extruder, the temperature differential between adjacent barrel segments is often 100° C. because of slow heat transfer to and from reactant material. Typical extruder residence times are 10–600 s. Residence time and, hence, the time available for chemical reaction is determined by extruder length, rate of introduction of reactants, and screw speed.

By the present process, Applicants surprisingly discovered that the carrier polymer and reactive polymer can be extruded simultaneously and that during the extrusion it is possible to react the reactive polymer with a multifunctional crosslinking agent so as to produce a gel during the extrusion process.

When gloss reduction is a sought after advantage, the amount of multi-functional crosslinking agent and reactive polymer should be sufficient that the amount of gel formed during the reactive extrusion step is greater than 35% of the reactive polymer concentration. It will also be understood by those skilled in the art that the amount of gel formed during the reactive extrusion process will vary according to the temperature of the extruder, the residence time in the extruder, the catalyst loading, the type and amount of multi-functional crosslinking agent as well as the general kinetics of the reaction.

When the carrier polymer comprises polycarbonate and/or polystyrene, and the reactive polymer a co-styrene acrylonitrile (SAN), it is preferred that the reactive extrusion process be run such that the gel forms either a co-continuous morphology with the carrier resin or is dispersed with large particles which are generally greater than about 5 microns in size. By "co-continuous morphology", it is meant that the domains of each phase are for the most part interconnected with itself.

As indicated above, Applicants unexpectedly discovered that the reactive extrusion process employing the use of a carrier polymer provides an additive concentrate which gives unexpectedly low gloss when used in thermoplastic compositions. This gloss level was unexpected as there was considerable fear that diluting the reactive phase with a carrier polymer would hinder the reaction from proceeding to any appreciable extent given the typically short residence times in extruders. There was also concern that the multi-functional crosslinking agent, and/or a catalyst, would be soluble in both polymers, thus reducing their effective concentration in the reactive SAN phase. In such event, the reaction rate would be reduced. Furthermore, given the complex morphology change involved using a carrier polymer and a reactive polymer as well as a multi-functional crosslinking agent, it was likewise completely unexpected that the present process achieves the high degree of control over the gel particle size that was achieved. The present process also has the surprising advantage that the reactive extrusion process actually increases the efficiency of the gel additive as compared to the two-step or masterbatch process of the prior art described in the background of the invention.

The gel containing additive concentrate produced in the reactive extrusion process described above is subsequently added to thermoplastic blends at concentrations ranging from 1 to 25 percent of the total composition in order to reduce the surface gloss of molded parts. The preferred thermoplastics include polycarbonate, ABS, ASA, AES polymer, polymethyl methacrylate, polystyrene, polyphenylene ether, polyimides, and polyolefins and blends thereof. The most beneficial carrier resin to use in the reactive extrusion of the additive concentrate is dependent on the composition of the thermoplastic blend to which the additive concentrate is to be added. For example, when the thermoplastic blend is comprised of polycarbonate and ABS, it is preferred to use polycarbonate as the carrier resin. However, when the thermoplastic blend is comprised primarily of ABS, polystyrene is the preferred carrier resin. The optimum choice of carrier resin is determined by the effect of the carrier resin on the properties of the thermoplastic blend and the surface quality of parts molded from the blend.

Typically, the additive concentrate is added to the thermoplastic blend in a subsequent compounding operation as shown in the examples which follow. However, it is also feasible according to the present invention that the thermoplastic blend components be added downstream in the same extrusion process used to make the concentrate.

It is also possible to further blend the composition with additional additives, e.g., flame retardants, drip retardants, dyes, pigments, UV stabilizers antioxidants, colorants, modifiers, fillers, reinforcing fillers, antistatic agents, plasticizers, lubricants, flow promoters etc., or mixtures thereof. These additives are known in the art, as are their effective levels and methods of incorporation. Effective amounts of the additives vary widely, but they are usually present in an amount of from about 0.1% to 50% by weight, based on the weight of the entire composition.

The following examples illustrate the present invention, but are not intended to limit the scope of the claims in any manner whatsoever. All parts are by weight unless otherwise specified. The following abbreviations apply throughout the examples:

| | |
|---|---|
| ZSK-30 - | 30 mm Co Rotating, intermeshing Twin Screw Extruder; |
| ZSK-58 - | 58 mm Co Rotating, intermeshing Twin Screw Extruder; |
| PC-125 - | ~38,000 Mw bisphenol-A polycarbonate; |
| PC 5221 - | ~25,000 Mw bisphenol-A polycarbonate; |
| DBSA - | dodecylbenzene sulfonic acid; |
| ERL - | Oxabicyclo [4.1.0] heptane-3 carboxylic acid 7 oxabicyclo [4.1.0] hept-3-ylmethl ester; |
| LG - | Low Gloss; |
| TSE - | Twin Screw Extruder; |
| HRG - | 50% Butadiene ABS High Rubber Graft; |
| SAN - | Styrene-Acrylonitrile Copolymer; |
| MB - | Masterbatch |
| RT - | Room temperature |
| AO - | Antioxidant |
| PS - | Polystyrene |

EXAMPLES

EXAMPLE 1

The following example illustrates the reaction of the present invention wherein a SAN gel additive is produced in the presence of an inert carrier resin.

TABLE I

| Component | pbw | |
|---|---|---|
| Carrier | 50.0 | |
| SAN | 50.0 | |
| ERL | 1.50 | 3% based on SAN |
| DBSA | 0.06 | 1200 ppm based on SAN |

Figure 3:
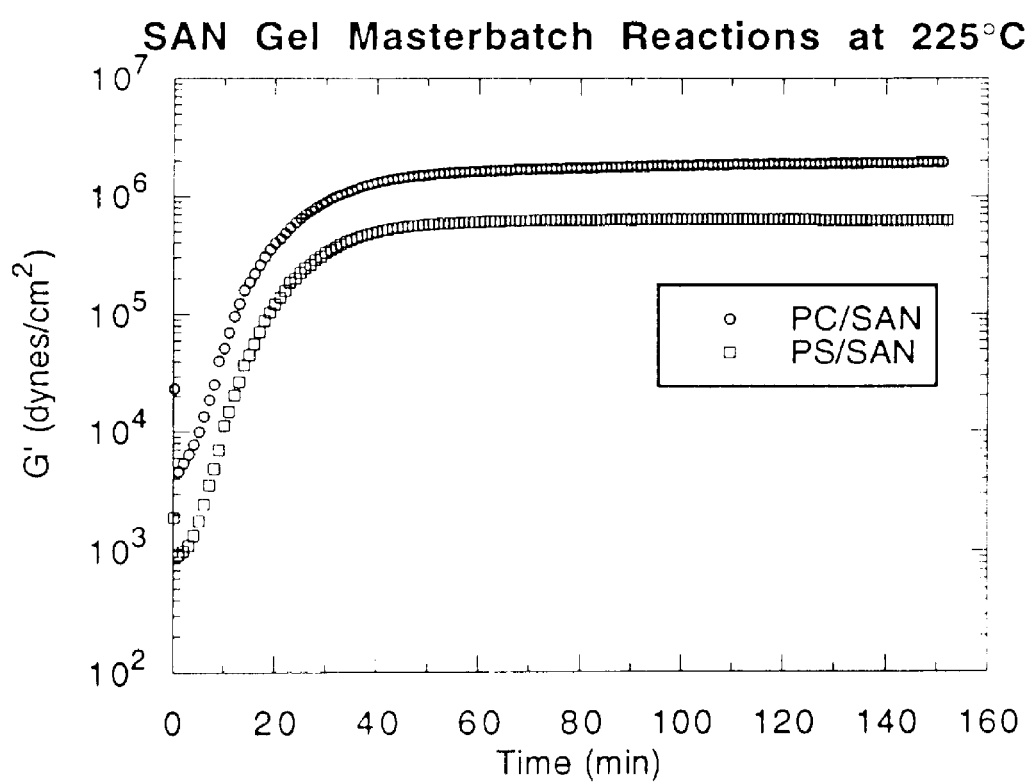
FIG. 3 shows a plot of storage modulus, G', versus time for two exemplary SAN/gel additive compositions.

The samples above were prepared by solution mixing the components in methylene chloride, followed by removal of the solvent under vacuum. The gelation reactions were monitored on an RDS 7700 Dynamic Spectrometer equipped with one inch diameter plates and a nitrogen purged environmental chamber. The reactions were performed at 225° C. using a frequency of 0.4 rad/s. The temperatures were selected to facilitate the monitoring of the reaction by extending the reaction time. Reaction rates at typical extrusion temperatures would be more rapid. The dynamic properties were monitored as a function of time. The change in storage modulus, G', with time is shown in FIG. 3, The storage modulus is particular sensitive to polymer branchings and crosslinking reactions. There are considerable differences in the starting values of G'which reflect the differences in the rheological properties of the carrier resins. For both samples, G' increases by more than two orders of magnitude during the first thirty minutes of the test. The initial rates of increase in the modulus are similar for the two samples indicating that they have similar reactivities. After one hour, the reactions are essentially complete and the properties become quite stable. The similarities in the shapes of the two curves provide clear evidence that the SAN gelation reaction proceeds at approximately the same rate in both polystyrene and polycarbonate.

EXAMPLE 2

This examples illustrates the method of the present invention wherein a reactive polymer was mixed with a carrier polymer and the two were extruded in the presence of a multi-functional crosslinking agent Table III compares the present invention with the masterbatch (multi-stage) technique described in the Background of the Invention section. The fact that the carrier polymer (e.g., PC) did not significantly participate in nor hinder the reaction is exemplified in Table II below. This example also demonstrates that the multi-functional crosslinking agent was not deactivated by the carrier polymer.

TABLE II

| Sample | ZSK-30 Compounding Lb/hr @ rpm | PC Grade | DBSA ppm | ERL % | PC Mn Thousands | PC Mw Thousands |
|---|---|---|---|---|---|---|
| PC powder | None | PC-125 | None | None | 19.2 | 38.8 |
| 1 | 50 @ 500 | PC-125 | 800 | None | 17.4 | 38.5 |
| 2 | 50 @ 500 | PC-125 | 800 | 3 | 16.3 | 37.0 |

The variation in molecular weight difference between the powder and Sample 1 is typical of measurement and the usual "grade drop" in going from PC powder to pellets. There is apparently no chain extension of the PC due to the ERL. The molecular weight drop in Sample 2 can be explained by transesterification.

Table III below is a comparison of a low gloss PC/ABS blends made by the technique described in this disclosure (Blend 2) with the same product made by the techniques described by U.S. Ser. No. 08/110,142(U.S. Pat. No. 5,536, 780) (Blend 1).

TABLE III

| Blend: Description | 1 Compounded MasterBatch of Gel | 2 DRxE Gel Insitu, 50% | 3 DRxE Gel Insitu, 67% | |
|---|---|---|---|---|
| RxE Process on a ZSK-58 | | | | |
| SAN | 500.0 | 511.0 | 648 | Lb/Hr |
| ERL-4221 | 19.5 | 16.3 | 25.9 | Lb/Hr |
| DBSA | 3.0 | 4.2 | 6.6 | Gm/Min |
| Water | 9.8 | 0.0 | 0.0 | Gm/Min |
| PC 125 | 0.0 | 511.0 | 0.0 | Lb/Hr |
| PC 5221 | 0.0 | 0.0 | 324. | |
| Total | 519.5 | 1038.2 | 1004 | Lb/Hr |
| Gel Throughput | 519.5 | 527.3 | 673.9 | Lb/Hr |
| ZSK Utilization | 1.92 | 1.90 | 1.48 | Hr/1000 Lb Gel |
| Die Pressure Drop | 1884 | 1331 | 1820 | psi |
| Melt Temp | 659 | 599 | 617 | °F. |
| Master Batch Compounding | | | | |
| GEL (from above) | 400 | | | Lb/Hr |
| PC 5221 | 400 | | | Lb/Hr |
| Total | 800 | | | Lb/Hr |
| ZSK Utilization | 2.25 | 0 | 0 | Hr/1000 Lb Gel |
| Cumulative RxE and MB Compounding | | | | |
| ZSK Utilization | 4.17 | 1.90 | 1.48 | Hr/1000 Lb Gel |
| LG PC/ABS Alloy Compounded on a Lab, 34 mm Leistritz TSE Formulation | | | | |
| PC | 59.0 | 59.0 | 62.75 | Parts/100 Resin |
| HRG | 16.0 | 16.0 | 16.0 | |
| SAN | 15.0 | 15.0 | 17.5 | |
| Compounded Gel MB | 10.0 | — | — | |
| Institu Gel MB | — | 10.0 | 3.75 | |
| Lube and A0 | 0.8 | 0.8 | 1.10 | |
| Total | 100.8 | 100.8 | 101.10 | |
| Properties Hunter 60° Gloss | | | | |
| Polished Side | 29 | 14 | 16 | 4 × 6 Sierra Plq. |

TABLE III-continued

| Blend: Description | 1 Compounded MasterBatch of Gel | 2 DRxE Gel Insitu, 50% | 3 DRxE Gel Insitu, 67% | |
|---|---|---|---|---|
| Textured | 8.4 | 5.3 | 6.6 | |
| Izod Impact @ RT | 11.0 | 10.2 | 11.1 | 1 Ft. Lb./In. |
| Apparent Melt Viscosity @ 550° F. | | | | |
| 100 sec-1 | 3738 | 3272 | 2765 | poise |
| 500 sec-1 | 2117 | 1959 | 1760 | |
| 100 sec-1 | 1557 | 1508 | 1372 | |

The final product made via the present process (Blend 2) had a lower gloss than previous technology (Blend 1), 14 vs 29. It is surprising to note that this significant gloss reduction was achieved at the same loading of gloss reducing gel. The extruder time required to produce the Gel MasterBatch additive was 2.12 times higher according to the comparative process (Blend 1) vs the insitu technique of the present process (Blend 2).

Blend 3 in Table III is for another low gloss formulation made using the techniques of the present invention. The DRxE process has been modified for increased extruder utilization by increasing the reactive ingredient concentration from 50.8% in Blend 2 to 67.1% in Blend 3 and by using a lower molecular weight PC carrier. The final compounded low gloss product in Blend 3 had a gloss level only slightly higher than Blend 2 with a significantly lower loading of the gloss reducing gel.

EXAMPLE 3

An example of the applicability of the present invention in producing low gloss, robust thermoplastic compositions is presented in Table IV. Sample 4 is the control ABS formulation without the gloss reducing DRxE Gel MB. Samples 5 and 6 have 5.0 and 7.5 parts of the DRxE product added to achieve gloss levels of 41 and 27 respectively vs 92 for the control. There was a slight decrease in the Impact and no effect on the Melt Viscosity at 1000 sec-1 with the addition of the Institu Gel MB to the formulation.

TABLE IV

Low Gloss ABS Examples

| FORMULATION | Sample 4 | Sample 5 | Sample 6 | |
|---|---|---|---|---|
| HRG | 35.0 | 35.0 | 35.0 | Parts/100 Resin |
| SAN | 65.0 | 60.0 | 57.5 | |
| Insitu Gel MB fm DRxE** | 0 | 5.5 | 7.3 | |
| Lube and AO | 1.1 | 1.1 | 1.1 | |
| Black Pigment | 1.0 | 1.0 | 1.0 | |
| TOTAL | 102.1 | 102.1 | 102.1 | |
| PROPERTIES: | | | | |
| Gloss 60' 0 min | 92.5 | 40.7 | 27.2 | Polished Plaque |
| Izod Impact @ RT | 26.7 | 20.3 | 18.3 | KJ/SqMeter |
| Izod Impact @ −10' C. | 12.2 | 9.1 | 8.9 | |
| Apparent Melt Viscosity | 262 | 266 | 265 | Pa s @230° C. 1000 sec − 1 |

⅔ SAN Gel, ⅓ PC 5221 from the RxE process as described in Sample 3.

EXAMPLE 4

A single step SAN gel masterbatch extrusion was conducted using polystyrene and polycarbonate carrier resins. The formulation used for the extrusion is shown in Table V below.

TABLE V

| Component | pbw | |
|---|---|---|
| SAN | 67.0 | |
| Carrier | 33.0 | |
| ERL | 2.0 | 3% based on SAN |
| DBSA | 0.08 | 1200 ppm based on SAN |

The extrusions were carried out on a WP30 extruder at a rate of 40 lb/hr. The measured melt temperature at the extruder die was approximately 300° C. for both carriers.

The gel content and swell index of the SAN was determined for the PC and PS based masterbatch samples. Soxhlet extraction with methylene chloride was used to remove the soluble portion of the samples. The swell indices were also determined in methylene chloride. The properties of the extruded SAN gel masterbatch samples are shown in the following Tables:

TABLE VI

| Carrier | % Gelled SAN | SAN Gel Swell Index |
|---|---|---|
| Polycarbonate | 66 | 21.4 |
| Polystyrene | 69 | 23.6 |

The results show that the SAN gels produced with the PC and PS carrier resins have similar gel contents and swell indices, which are an indication of the crosslink density of the gels.

To test the performance of these carrier/SAN gels as gloss reducing agents, the following blend formulations were produced:

TABLE VII

| | Blend No. | | | |
|---|---|---|---|---|
| | 1 | 2 SAN Gel | 3 PC/SAN | 4 PS/SAN |
| HRG | 20 | 35 | 35 | 35 |
| SAN | 30 | 65 | 65 | 65 |
| Bulk ABS | 50 | | | |
| SAN Gel | | 5 | | |
| PC/SAN Gel | | | 4.5 | |
| PS/SAN Gel | | | | 4.5 |
| Impact Modifier | | 2 | 2 | 2 |
| Lube/UV stabilizers | 0.85 | 3.1 | 2.5 | 3.1 |
| Pigments | 3.55 | 3.55 | 3.55 | 3.55 |

Blend 1 is a commercially available low gloss ABS resin based on bulk ABS technology. Blend 2 is a low gloss ABS formulation based on a SAN gel produced with no carrier resin. These first two blends are included for reference.

Blends 3 and 4 are blends based on the experimental PC/SAN gel and PS/SAN gel masterbatches, respectively. The properties of these blends are shown in the Table below:

TABLE VIII

| Blend No. | 1 | 2 | 3 | 4 |
|---|---|---|---|---|
| *Melt Viscosity (Pa s) | 281 | 265 | 262 | 260 |
| N Izod at RT (kJ/m$^2$) | 16.7 | 20.4 | 19.4 | 23.2 |
| N Izod at 0° C. (kJ/m$^2$) | 11.3 | 12.1 | 13.4 | 11.9 |
| RT Falling Dart Impact (Nm) | 60.1 | 17.2 | 17.8 | 34.0 |
| Tons. Yield Strength (MPa) | 34.7 | 41.7 | 40.5 | 41.1 |
| Elongation (%) | 104 | 19 | 18 | 44 |
| Hunter 60° Gloss (%) | 52 | 15 | 17 | 23 |

*Melt viscosity measurements were performed at 230° C. and 1000 s$^{-1}$

As clearly demonstrated in the above Table, the use of the PS/SAN gel masterbatch additive provides an ABS blend (Blend 4) with significantly lower gloss than the resin based on bulk ABS (Blend 1) and gloss levels similar to the blends which use the PC/SAN gel additive (Blend 3). At the same time, the PS/SAN gel based blend has better impact strength and elongation than the other SAN gel based blends while retaining the same flow properties. In addition, parts injection molded from Blend 4 had a superior surface quality to those produced from Blends 2 and 3, and comparable to the commercial product based on bulk ABS (Blend 1).

EXAMPLE 5

TABLE IX

| Blend # | 1 | 2 | 3 | 4 | 5 | 6 | |
|---|---|---|---|---|---|---|---|
| HRG | 25 | 25 | 8 | 8 | | | |
| SAN | 30 | 30 | 12 | 12 | | | |
| Alphamethylstyrene resin | 45 | 45 | 80 | 80 | 100 | 100 | |
| PS/SAN gel | 4.5 | — | 4.5 | | 4.5 | — | |
| Lube | 2.3 | 2.3 | 2.3 | 2.3 | 2.3 | 2.3 | |
| Pigment (carbon black) | 1 | 1 | 1 | 1 | 1 | 1 | |
| Melt flow Rate 220° C./10 kg | 7.6 | 8.4 | 4.7 | 4.9 | 2.8 | 2.8 | g/10 min |
| Notched Izod Impact 180/1A RT | 17.1 | 20.1 | 10.1 | 13.1 | 10 | 13 | kJ/m$^2$ |
| Tensile Yield Strength | 41.6 | 40.4 | 45.3 | 43.1 | 45.1 | 44.2 | MPa |
| Elongation at break | 42 | 32 | 46 | 47 | 51 | 53 | % |
| Vicat B120 | 101 | 105 | 110 | 110 | 113 | 114 | °C. |
| Gloss (melt 27° C./mold 40° C.) Smooth Surface | 37 | 95 | 31 | 95 | 20 | 94 | %60° |

Blends 2, 4 and 6 were commercially available alphamethylstyrene-ABS formulations. To these blends 4.5 parts of PS/SAN gel referenced in Table VI in Example 4 were added to give blends 1, 3, and 5 respectively. The results clearly demonstrate that the addition of PS/ABS gel masterbatch additive in the alphamethylstyrene containing ABS compositions provides a significant gloss reduction, while the tensile flow, and thermal properties are maintained.

While the invention has been described in terms of various preferred embodiments, those skilled in the art will appreciate that various modifications, substitutions, omissions, and changes may be made without departing from the spirit thereof. Accordingly, it is intended that the scope of the present invention be limited solely by the scope of the following claims, including the equivalents thereof.

We claim:

1. A reactive extrusion process for making gel-containing low gloss additive concentrate, said reactive extrusion process comprising:

A. mixing a nitrile-containing polymer with a carrier polymer selected from the group consisting of polycarbonate polymers, polystyrene polymers and mixtures thereof; and B. reactively extruding said nitrile-containing polymer and said carrier polymer in the presence of a polyepoxide crosslinking agent and an acid catalyst selected from organic acids, mineral acids, Lewis acids and mixtures thereof, such that said nitrile-containing polymer crosslinks to form a gel.

2. The process of claim 1, wherein said nitrile-containing polymer is styrene acrylonitrile.

3. The process of claim 1, wherein said gel is present in said carrier polymer as a co-continuous phase or a dispersed phase with an average particle size of greater than about 5 μm.

4. The process of claim 3, wherein said gel is present in said carrier as a dispersed phase with an average particle size ranging from about 10 μm to about 30 μm.

5. The process of claim 1, wherein said carrier polymer is polycarbonate.

6. The process of claim 1, wherein said carrier polymer is polystyrene.

7. The process of claim 1, wherein said acid catalyst is dodecylbenzene sulfonic acid or zinc chloride.

8. The process of claim 1, wherein said process further comprises

C. blending the reaction product of B with an additional polymer or mixture of polymers.

9. The process of claim 8, wherein said additional polymer is selected from the group consisting of styrene acrylonitrile, acrylonitrile styrene butadiene, polycarbonate, alphamethylstyrene copolymers, N-phenyl polyimide copolymers and mixtures thereof.

10. The process of claim 8, wherein said process further comprises

D. blending the reaction product of C with an additive selected from the group consisting of flame retardants, drip retardants, dyes, pigments, UV stabilizers, thermo stabilizers, colorants, modifiers, and mixtures thereof.

11. The process of claim 1, wherein the carrier polymer is extruded in the thermoplastic composition at a level ranging from about 20 to about 99 percent based on the total weight of the composition.

12. The process of claim 1, wherein said nitrile-containing polymer is extruded at a level, ranging from about 1 to about 80 percent based on the total weight of the composition.

13. The process of claim 1, wherein the amount of said gel formed from said reactive extrusion step is greater than 35% of the nitrile-containing polymer.

14. The process of claim 1, wherein the amount of gel formed from said reactive extrusion is sufficient to significantly reduce the gloss of said thermoplastic composition.

15. The composition produced by the process of claim 1, wherein an article molded from said composition has a Hunter Gloss at 60° of less than 60.

* * * * *

UNITED STATES PATENT AND TRADEMARK OFFICE
CERTIFICATE OF CORRECTION

PATENT NO. : 5,770,652
DATED : Jun. 23, 1998
INVENTOR(S) : William David Richards, et al It is certified that error appears in the above-identified patent and that said Letters Patent is hereby corrected as shown below:

On title page, add item [73] to read as follows:

[73] Assignee: General Electric Company, Pittsfield, MA.

Signed and Sealed this

Tenth Day of August, 1999

Attest:

Q. TODD DICKINSON

*Attesting Officer*     *Acting Commissioner of Patents and Trademarks*